United States Patent
Kelly, deceased et al.

[15] 3,637,018
[45] Jan. 25, 1972

[54] IN SITU RECOVERY OF OIL FROM TAR SANDS USING WATER-EXTERNAL MICELLAR DISPERSIONS

[72] Inventors: Joe T. Kelly, deceased, late of Littleton, Colo. by Laverne S. Kelly, executrix; Fred H. Poettmann, Littleton, Colo.

[73] Assignee: Marathon Oil Company, Findlay, Ohio

[22] Filed: Dec. 29, 1969

[21] Appl. No.: 888,897

[52] U.S. Cl. ................................................166/272, 166/273
[51] Int. Cl. .....................................E21b 43/22, E21b 43/24
[58] Field of Search ................................166/268, 271–275; 208/11

[56] References Cited

UNITED STATES PATENTS

| | | | |
|---|---|---|---|
| 2,910,123 | 10/1959 | Elkins et al. | 166/271 |
| 3,221,813 | 12/1965 | Closmann et al. | 166/271 |
| 3,342,261 | 9/1967 | Bond | 166/271 X |
| 3,343,597 | 9/1967 | Gogarty et al. | 166/274 X |
| 3,375,870 | 4/1968 | Satter et al. | 166/271 X |
| 3,392,105 | 7/1968 | Poettmann et al. | 208/11 |
| 3,504,744 | 4/1970 | Davis et al. | 166/274 X |
| 3,506,070 | 4/1970 | Jones | 166/274 X |

*Primary Examiner*—Ian A. Calvert
*Attorney*—Joseph C. Herring, Richard C. Willson, Jr. and Jack L. Hummel

[57] ABSTRACT

Oil from subsurface tar sand having an injection means in fluid communication with a production means is recovered by injecting a water-external micellar dispersion at a temperature above 100° F., into the tar sands, displacing it toward the production means and recovering the oil through the production means. The micellar dispersion can be preceded by a slug of hot water which can optionally have a pH greater than about 7. Also, the micellar dispersion can have a pH of about 7–14 and preferably a temperature greater than about 150° F. The micellar dispersion contains hydrocarbon, surfactant, aqueous medium, and optionally cosurfactant and/or electrolyte.

19 Claims, No Drawings

IN SITU RECOVERY OF OIL FROM TAR SANDS USING WATER-EXTERNAL MICELLAR DISPERSIONS

BACKGROUND OF THE INVENTION

Tar sands, also known as oil sands and bituminous sands, are sands that contain a very viscous hydrocarbon. One of the largest deposits is the Athabasca sands found in Northern Alberta, Canada. Tar sands generally have an asphaltic appearance due to the viscous hydrocarbon within the sand. The oil or hydrocarbon within tar sands is very viscous, substantially more viscous than crude oil obtained from the normal oil-bearing subterranean formation.

It is known in the prior art that hydrocarbon from tar sands can be recovered by first flooding with steam and then following this steam flood with an aqueous solution of sodium hydroxide. The sodium hydroxide slug aids in emulsification of the oil in the tar sands.

U.S. Pat. No. 2,882,973, to Doscher et al. teaches the use of an aqueous solution containing a nonionic surface-active agent and optionally a neutral salt, the solution at a pH of at least 12. Examples of useful nonionic surfactants include oil-soluble monohydric alcohols, oil-soluble dihydric alcohols, and oil-soluble alcohols containing substituents such as ether and/or ester groups. The nonionic surfactant is present in sufficient concentration to effect instantaneous or spontaneous emulsion of the oil or tarry material present in tar sands and to maintain it in the emulsified state. Concentrations of 0.1–5 percent by weight are effective for this purpose. The high pH is obtained by adding alkali metal hydroxide or ammonia.

Also, combustion methods have been used to recover the oil from tar sands. Air is injected into the tar sand reservoir and the sands combusted. The fire front distills the oil ahead of it and the fuel for the fire is mainly the coke deposited by the destructive distillation.

SUMMARY OF THE INVENTION

Applicant has discovered a novel method of recovering oil from tar sands by injecting a water-external micellar dispersion into the subsurface tar sands and displacing it therethrough toward a production means in fluid communication with the tar sands. The water-external micellar dispersion contains hydrocarbon, surfactant, and aqueous medium and can have a pH of about 7–14, the higher PH aids in emulsification of the oil. The micellar dispersion can be preceded by a hot water flood, the water flood can be at a pH greater than 7. In addition, the micellar dispersion can be followed by a drive material, e.g., drive water. The mobility buffer acts to impart a more stable flow to the process.

DESCRIPTION OF THE PREFERRED EMBODIMENTS

The water-external micellar dispersion is comprised of hydrocarbon, surfactant, and aqueous medium. Optionally, alcohol and/or electrolyte can be incorporated. Examples of useful volume amounts include from about 1 to about 50 percent hydrocarbon, about 40 to about 95 percent aqueous medium, at least about 4 percent surfactant, about 0.01 to about 20 percent cosurfactant, and about 0.001 to about 5 percent by weight of electrolyte. In addition, the dispersion can contain other additives such as corrosion-inhibiting agents, bactericides, sequestering agents, etc.

Examples of useful hydrocarbons include crude oil, partially refined fractions thereof, e.g., side cuts from crude columns, crude column overheads, gas oils, kerosene, heavy naphthas, naphthas, straight-run gasoline, liquefied petroleum gases, etc., and refined fractions thereof including propane, pentane, decane, dodecane, aryl compounds such as benzene, naphthalene, anthracene, and substituted products thereof. Also, the hydrocarbon can be a synthesized hydrocarbon. In addition, the unsulfonated hydrocarbon (e.g., heavy vacuum gas oils) in petroleum sulfonates is also useful.

The aqueous medium can be soft, brackish, or a brine water. Preferably, the water is soft but it can contain small amounts of salts which are compatible with the ions within the tar sands.

The surfactant can be anionic, cationic, and nonionic. Examples of useful surfactants include those found in U.S. Pat. No. 3,254,714 to Gogarty et al. Especially useful surfactants are the petroleum sulfonates, also known as alkyl aryl naphthenic sulfonates. Preferred petroleum sulfonates include those having an average equivalent weight of about 350 to about 520 and more preferably about 400 to about 460. The sulfonate is preferably one containing a monovalent cation. Mixtures of different surfactants as well as mixtures of low, medium and high average equivalent weight surfactants or sulfonates are useful.

The cosurfactant (also known as semipolar organic compound and cosolubilizer) can have limited water solubility. Preferably, the water solubility of the cosurfactant is from about 0.1 to about 20 percent or more and more preferably about 1 to about 5 percent at ambient temperature. Examples of useful cosurfactants include alcohols, amino compounds, esters, aldehydes, ketones and like compounds containing from 1 to about 20 or more carbon atoms and more preferably about three to 16 carbon atoms. Specific examples of useful alcohols include isopropanol, n- and isobutanol, the amyl alcohols include isopropanol, n- and isobutanol, the amyl alcohols such as n-amyl alcohol, 1- and 2-hexanol, 1- and 2-octanol, decyl alcohols, alkaryl alcohols, and alcoholic liquors such as fusel oil. The alcohols can be primary, secondary, and tertiary alcohols. Preferably, concentrations of about 0.01 to about 5 percent by volume are useful in the micellar dispersion and more preferably about 0.1 to about 3 percent. Mixtures of two or more different cosurfactants are useful.

The electrolyte useful in the water-external micellar dispersions include inorganic bases, inorganic acids, and inorganic salts; organic bases, organic acids and organic salts, which are either weakly or strongly ionized. Preferably the electrolytes are inorganic bases, inorganic acids, and inorganic salts, e.g., sodium hydroxide, sodium chloride, sodium sulfate, hydrochloric acid, sulfuric acid, sodium nitrate, ammonium hydroxide, etc. Examples of other useful electrolytes can be found in U.S. Pat. No. 3,330,343 to Tosch et al. Preferably, the electrolyte is one that will yield a high pH, e.g., sodium or ammonium hydroxide and like materials.

Examples of useful water-external micellar dispersions are taught in copending patent applications identified as U.S. Ser. Nos. 693,125, filed Dec. 26, 1967 now U.S. Pat. No. 3,506,071 to Jones; and 693,099, filed Dec. 26, 1967, now U.S. Pat. No. 3,506,070 to Jones.

Preferably the pH of the micellar dispersion is above about 7 and more preferably about 10–14. The desired pH can be obtained by adding the appropriate electrolyte to obtain the desired pH, e.g., NaOH, NH$_4$OH, etc.

Also, the temperature of the micellar dispersion is preferably above 100° F. and more preferably above about 150° F. This can be effected by heating the micellar dispersion before injecting it into the injection means. Also, it can be obtained by letting the subterranean conditions heat the micellar dispersion as the dispersion progresses down the well bore precedent to being injected into the tar sand. Where higher temperatures, e.g., 100°–150° F. and greater, are desired, the components of the micellar dispersion are desirably designed to obtain a stable dispersion at the high temperature. For example, increasing the aromaticity of the hydrocarbon, increasing the electrolyte content, increasing the molecular weight of the surfactant and/or cosurfactant, etc., are methods useful to obtain dispersions stable at high temperatures. Specific methods of increasing the thermostability range to higher temperatures are taught in copending patent applications identified as U.S. Ser. Nos. 746,258, filed July 22, 1968, now U.S. Pat. No. 3,493,048 to Jones; 746,282, filed July 22, 1968, now U.S. Pat. No. 3,493,047 to Davis, et al.; 746,391, filed July 22, 1968, now U.S. Pat. No. 3,495,669 to Davis et al.; 754,524, filed July 22, 1968, now U.S. Pat. No. 3,500,912 to Davis et al.; and 746,390, filed July 22, 1968, now U.S. Pat. No. 3,508,611 to Davis et al.

The water-external micellar dispersion can be preceded by a water slug. The water slug can be and preferably is at a temperature greater than 100° F. and more preferably at a temperature above about 150° F. the water slug is at this temperature before entering the formation. Also, the pH of the prewater slug can be adjusted to about 7–14. High pH's aid in the emulsification of the oil. The high pH can be obtained by adding water-soluble bases, e.g., NaOH, etc. Volume amounts up to about 1 pore volume and greater are useful as a preslug.

The mobility or the effective mobility of the micellar dispersion in the tar sands can be decreased to give a more stable fluid flow to reduce or inhibit fingering. Such can be obtained by adjusting the components within the micellar dispersion to obtain a desired viscosity.

The micellar dispersion can be followed by a drive material. Optionally, a mobility buffer can be injected behind the micellar dispersion and this, in turn, followed by the drive material. Examples of useful mobility buffers include aqueous and nonaqueous fluids containing mobility reducing agents such as high-molecular weight partially hydrolyzed polyacrylamides, polysaccharides, polyisobutylenes, etc. Generally, any mobility-reducing agent is useful as long as it is compatible with the dispersion and the tar sands and does effectively reduce the mobility of the aqueous or nonaqueous mobility buffer slug flowing in the tar sands.

As mentioned previously, the micellar dispersion can be followed by a drive material. The drive material can be aqueous or nonaqueous and can be liquid, gas, or a combination of the two. Preferably it is an aqueous drive material. The drive material can contain ions and it is preferred that the ions are compatible with the ions within the subterranean formation.

Formation pore volumes of about 1 to about 30 percent or more of the water-external micellar dispersion are useful with this invention. More preferably, from about 1 to about 10 percent formation pore volume is useful. The mobility buffer can be in amounts of up to about 5 to about 75 percent or more formation pore volume.

It is not intended that the invention be limited by the specifics taught above. Rather, all equivalents obvious to those skilled in the art are intended to be included within the s cope of the invention as defined within the specification and appended claims.

What is claimed is:

1. A process of recovering oil from subsurface tar sands having at least one injection means in fluid communication with at least one production means, comprising heating a water-external micellar dispersion to a temperature above about 100° F., injecting the heated micellar dispersion into the tar sands, displacing the micellar dispersion toward the production means and recovering oil through said production means.

2. The process of claim 1 wherein the water phase of the micellar dispersion has a pH within the range of about 7 to about 14.

3. The process of claim 1 wherein a slug of hot water precedes the injection of the micellar dispersion.

4. The process of claim 3 wherein the pH of the water is above about 7.

5. The process of claim 1 wherein the micellar dispersion is comprised of hydrocarbon, surfactant, and aqueous medium.

6. The process of claim 5 wherein the micellar dispersion contains cosurfactant and/or electrolyte.

7. The process of claim 1 wherein the temperature of the micellar dispersion is above about 150° F.

8. The process of claim 1 wherein a mobility buffer is injected after the micellar dispersion.

9. The process of claim 1 wherein an aqueous drive material is used to displace the micellar dispersion toward the production means.

10. A process of recovering oil from subsurface tar sands having at least one injection means in fluid communication with at least one production means, comprising:
   1. heating a water-external micellar dispersion to a temperature above about 100° F., injecting about 1 to about 30 percent formation pore volume of the heated water-external micellar dispersion into the tar sands,
   2. thereafter, injecting about 5 to about 75 percent formation pore volume of a mobility buffer into the tar sands,
   3. and then injecting sufficient drive material to displace the micellar dispersion and mobility buffer toward the production means and recovering oil through the production means.

11. The process of claim 10 wherein up to about 100 percent formation pore volume of an aqueous preslug is injected into the tar sands before the micellar dispersion is injected.

12. The process of claim 11 wherein the pH of the aqueous preslug is within the range of about 7 to about 14.

13. The process of claim 10 wherein the micellar dispersion is comprised of hydrocarbon, surfactant, and aqueous medium.

14. The process of claim 13 wherein the micellar dispersion contains cosurfactant and/or electrolyte.

15. The process of claim 13 wherein the surfactant is petroleum sulfonate.

16. The process of claim 10 wherein the mobility buffer is an aqueous solution containing a mobility-reducing agent.

17. The process of claim 10 wherein the drive material is aqueous.

18. The process of claim 10 wherein the pH of the water phase of the micellar dispersion is within the range of about 7 to about 14.

19. The process of claim 10 wherein the micellar dispersion is at a temperature above about 150° F.

* * * * *

UNITED STATES PATENT OFFICE
CERTIFICATE OF CORRECTION

Patent No. __3,637,018__   Dated __January 25, 1972__

Inventor(s) __Joe T. Kelly, deceased, et al__

It is certified that error appears in the above-identified patent and that said Letters Patent are hereby corrected as shown below:

Col. 1, line 49:   After "a" insert --mobility buffer and this, in turn, followed by a--.

Col. 2, line 24:   Delete "include isopropanol, n- and isobutanol, the amyl alcohols".

Signed and sealed this 15th day of August 1972.

(SEAL)
Attest:

EDWARD M. FLETCHER, JR.   ROBERT GOTTSCHALK
Attesting Officer         Commissioner of Patents